Nov. 4, 1969   R. W. SOKOL ET AL   3,475,975
ELECTROMAGNETIC GYROSCOPE FLOAT ASSEMBLY
Filed April 10, 1967   2 Sheets-Sheet 1
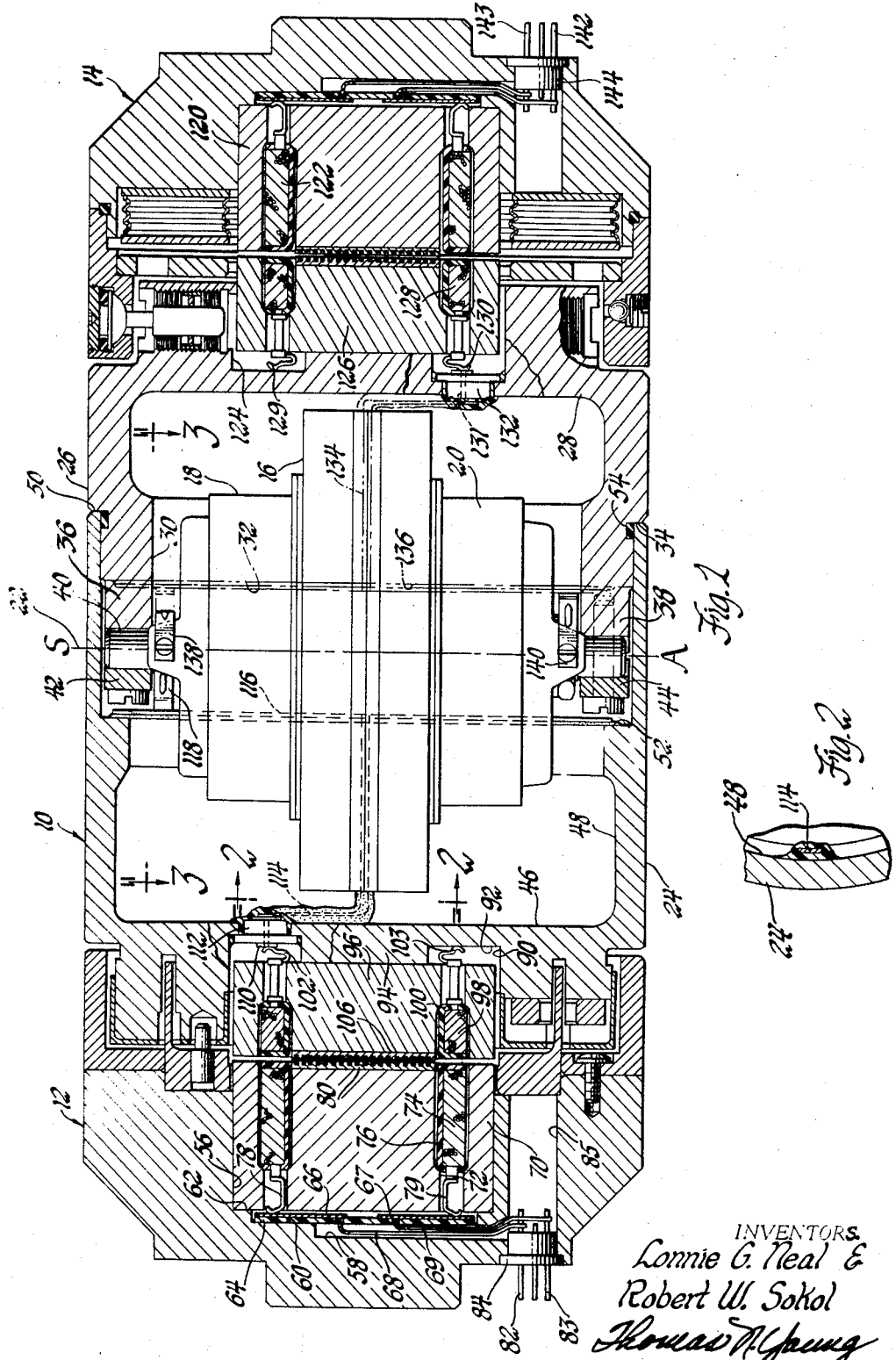
INVENTORS.
Lonnie G. Neal &
Robert W. Sokol
Thomas N. Young
ATTORNEY Nov. 4, 1969  R. W. SOKOL ET AL  3,475,975
ELECTROMAGNETIC GYROSCOPE FLOAT ASSEMBLY
Filed April 10, 1967  2 Sheets-Sheet 2

INVENTORS.
Lonnie G. Neal &
Robert W. Sokol
Thomas N. Young
ATTORNEY

United States Patent Office 3,475,975
Patented Nov. 4, 1969

3,475,975
ELECTROMAGNETIC GYROSCOPE
FLOAT ASSEMBLY
Robert W. Sokol and Lonnie G. Neal, Milwaukee, Wis., assignors to General Motors Corporation, Detroit, Mich., a corporation of Delaware
Filed Apr. 10, 1967, Ser. No. 629,478
Int. Cl. G01c 19/06
U.S. Cl. 74—5.7                                 8 Claims

ABSTRACT OF THE DISCLOSURE

A single axis gyroscope having an electromagnetic system for supporting a float assembly and for transferring two phase power to motors carried by the float assembly. Power transfer paths at opposite ends of the gyro each include inductively linked primary and secondary windings mounted in respective subassemblies, a conductive strip bonded to the float and extending from the secondary winding to points accessibly adjacent each of the motors, and resilient connectors depending from the motors to contact the strips thereby completing the motor power circuits.

---

This invention relates to gyroscopes and more particularly to an improved design for a gyro having a magnetically supported float assembly including at least one motor to which power is supplied by transformer action.

A gyroscope, especially gyros of the type used in inertial navigation systems, are complex devices which must be carefully and precisely constructed to provide maximum accuracy. One method for improving the accuracy of a single axis gyro, for example, is to support the float assembly by means of electromagnetic bearings rather than mechanical bearings. A still further improvement in the performance of a gyro can be realized by transferring power to the float assembly by transformer action rather than through flexible leads which might be connected between the float assembly and a surrounding housing. A combined magnetic suspension and power transfer system for accomplishing the aforementioned objectives is described in the patent to Clark 3,199,932 issued on Aug. 10, 1965.

The overall objective of the present invention is to provide for the improved construction of a gyro of the type having the electromagnetic float suspension and power transfer features of the Clark invention. In general, the improved construction includes the combination of a primary or power input subassembly associated with the gyro end housing and a secondary or power pickup subassembly which may be associated with the float. In a preferred form the primary and secondary subassemblies are similar in several respects; each comprise a pole piece of magnetic material such as ferrite which is slotted to receive an insulated inductive winding having resilient connector means to contact an electrical conductor disposed on the part to which the pole piece is ultimately fixed.

The invention is further accomplished in part through the provision of conductive means forming an electrical connection between the secondary or power pickup subassembly and the motor or motors which drive the inertial sensing element carried by the float. In a preferred form this is accomplished by means of a light conductive strip which is insulatively bonded to interior surfaces of the float assembly and terminated in locations accessibly adjacent the motor or motors. The motor itself may be provided with depending resilient contacts which engage the conductive strip upon assembly thereof to complete the electrical circuit in such a fashion as to permit efficient and economical mass production. This construction yields the further advantage of eliminating the rigid conductive rods which are sometimes used to form a conductive path between the motor and the external portion of the float assembly. Eliminating these rods also eliminates the need for most of the hermetic seals usually required at the insertion point of the rods.

The advantages of the invention may be further realized in part through the provision of a float assembly having two major portions which are mutually engageable to form a hollow cylindrical float adapted to receive the inertial sensing element and the drive motor or motors. In a preferred form, one of the float portions is provided with mounting means such as pillow blocks for receiving the motor assembly in such a fashion as to contemporaneously form at least one of the aforementioned electrical contacts with the motor supply circuit. Engagement of the two float portions contemporaneously accomplishes the remaining electrical connection for the motor or motors such that respective phases for a two phase motor may be supplied through separate and distinct electrical circuits.

Other features and advantages of the invention may be best appreciated by reading the following specification which is to be taken with the accompanying drawings of which:

FIGURE 1 is a cross-sectional view of the float assembly and end housings of a gyroscope embodying the invention;

FIGURE 2 shows a detail of the FIGURE 1 structure in large scale;

Figure 4:
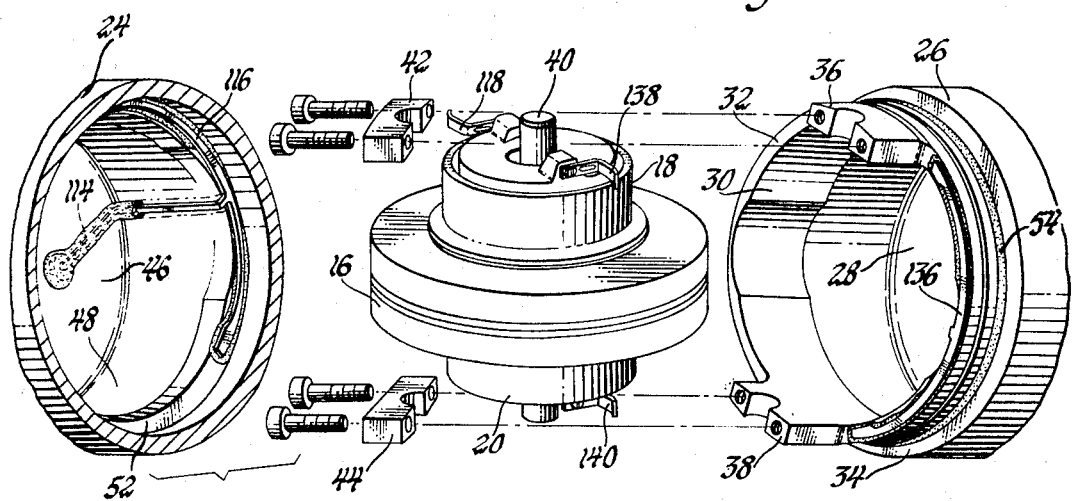

And FIGURE 4 is an exploded view of a portion of the float assembly shown in FIGURE 1.

The invention as described herein is applied to a single axis floated type gyro employing a float assembly which is both supported in a reference position and supplied with two phase electrical power for energization of the motors by means of a combined magnetic suspension and power transfer system. In FIGURE 1, float assembly 10 is shown in an axially and radially centered position with respect to gyro end housings 12 and 14. The end housings 12 and 14 are located at axially opposite ends of the float assembly by means of cylindrical casing not shown. Float assembly 10 is of generally cylindrical shape and is hollow to accommodate an inertial sensing element 16, commonly called a rotor, which is supported for rotation about a spin axis 22. An angular momentum vector is established by two-phase hysteresis motors 18 and 20 which, in concert, drive the rotor 16 about axis 22. The details of the rotor and motors are omitted for the sake of simplicity since these elements are now well known to those skilled in the art.

The shell of the float assembly 10 comprises two mutually engageable portions, i.e. a left hand portion 24 and a right hand portion 26 as shown in FIGURES 1 and 4. Float portion 26 is an axially symmetrical cup having an end wall 28 and an axial bore defining a cylindrical side wall 30 which terminates in general at an annular lip 32. The exterior surface of portion 26 is provided with an annular step 34 which is longitudinal mediate the end wall 28 and the lip 32. Portion 26 is also provided with pillow blocks 36 and 38 which are adapted to receive a shaft 40 of a preassembled cartridge comprising the combination of rotor 16 and hysteresis motors 18 and 20. The cartridge may be held in place by means of clamps 42 and 44 which are bolted to the pillow blocks 36 and 38 as shown in FIGURE 4.

Float portion 24 also takes the form of a cylindrical and axially symmetrical cup having an end wall 46 an axial step bore defining a cylindrical side wall 48 terminating in an annular lip 50 and having an annular step 52 longitudinally mediate the end wall 46 and the lip 50.

Properly assembled, the open ends of the float portions 24 and 26 are brought together in a coaxial fashion, portion 24 sliding over portion 26 until the annular lip 50 engages the annular step 34. An hermetic seal may be accomplished by means of the sealing ring 54.

Each of the hysteresis motors 18 and 20 must be supplied with two phase power to drive the inertial sensing rotor 16. In addition magnetic support forces must be generated to suspend the float assembly 10 between the end housings 12 and 14 for freedom of rotation about the longitudinal axis of the assembly. These two requirements are met by means of suspension and power transfer assemblies located at axially opposite ends of the overall assembly shown in FIGURE 1 and by means of electrical circuit means to be described in detail below. It will be observed that the suspension and power transfer means located at the opposite ends of the FIGURE 1 assembly are substantially identical. Accordingly, only one of the apparatus is described in detail with the understanding that the description is equally applicable to either side.

Looking to the left side of the apparatus shown in FIGURE 1 end housing 12 is provided with an axially extending cavity 56 which opens toward the float assembly 10 and which has three distinct internal steps 58, 60 and 62. An insulative disk 64 is cemented to step 60. Two semi-annular but spaced conductive strips 66 and 67 are printed onto the face of disk 64. Input leads 68 and 69 are connected through the disk 64 to the back of strips 66 and 67, clearance for the leads being provided by the difference in the axial depth of steps 58 and 60. Leads 68 and 69 are connected to pins 82 and 83 extending through a plug 84 which fits into a bore 85 formed in the housing 12 to provide an hermetic seal.

A cylindrical ferrite pole piece 70 is tightly disposed within the cavity 56. The ferrite pole piece 70 has formed therein an annular slot 72. A primary winding 74 wound on an insulative form 76 is cemented in the slot 72. Opposite ends of winding 74 are connected to resilient electrical contacts 78 and 79 which depend axially from the winding 74 toward the circuit disk 64. The pole piece 70 and the winding 74 may be treated as a subassembly and inserted into the end housing cavity 56 such that the spring contacts 78 and 79 engage respective conductive strips 66 and 67 thereby completing an electrical circuit through the inductive coil 74. In operation, one phase of a two-phase power supply is connected to the pins 82 and 83 to energize winding 74.

Pole piece 70 may have attached thereto a disk-like pole tip 80 having a plurality of concentric rings formed therein by electrical discharge machine or otherwise to define a plurality of flux concentration paths for purposes to be described.

Looking to the secondary or power pickup side of the combined suspension and power transfer apparatus, float portion 24 has formed therein a generally cylindrical cavity 90 having an outer annular land 92 and a raised central step 94. A ferrite pole piece 96 is cemented into the cavity 90. Piece 96 is slotted in the same fashion as pole piece 70 to receive an inductive secondary winding 98 wound on an insulative form 100. Opposite ends of secondary windings 98 are connected to resilient contacts 102 and 103 which protrude from the axially inner end of pole piece 96. Pole piece 96 has mounted on the face thereof a pole tip piece 106 having a plurality of concentric grooves machined in the surface thereof to match the grooves in the surface of pole tip 84. Resilient contact 103 engages the land 92 to ground one end of the winding 98 to the float portion 24. Resilient contact 102 engages the external button of a conductive pin 110 extending through a seal plug 112. Plug 112 is placed in a bore through the end of wall 46 of float portion 24 to prevent flotation fluid from entering the interior of the float.

The transformer circuit including windings 74 and 98 is used to supply one excitation phase to both motors 18 and 20. To accomplish this, a thin strip 114 of copper or other conductive material is bonded to the interior walls of float portion 24. The strip 114 is electrically connected to pin 110 which defines the float entry point for the motor circuit and extends along wall 46, axially up side walls 48 to the step 52 as shown in FIGURE 4. The strip 114 is insulatively bonded to portion 24 as shown in FIGURE 2. An arcuate conductive strip 116 is bonded to the step 52 and extends approximately 150° around the step. Strip 114 is connected to the mid point of strip 116 to distribute the electrical signal carried by strip 114 to two circumferentially spaced extremes defined by the ends of strip 116.

Figure 3:
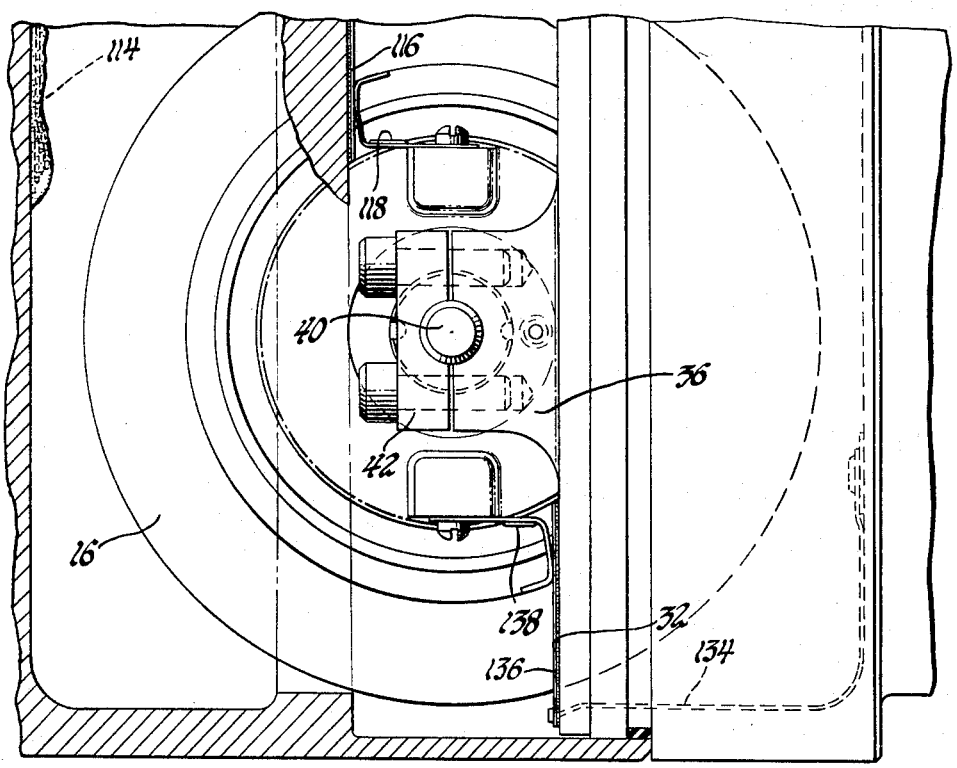
FIGURE 3 is an axial view of the motor assembly of the apparatus shown in FIGURE 1 and is taken along section line 3—3.

One phase of the two-phase stator winding of motor 18 is externally connected to a resilient contact 118 which depends from motor 18 in a direction perpendicular to the spin axis 22 to engage one of the circumferential extremities of strip 116 as best shown in FIGURE 3. Motor 20 is similarly provided with a resilient connector not shown which engages the circumferentially opposite extremity of strip 116 to provide an input for the first phase to motor 20. The stator windings of both motors 18 and 20 are grounded to the float thereby completing a return circuit to winding 98 by way of contact 103.

Looking to the right side of the apparatus shown in FIGURE 1, end housing 14 has associated therewith a ferrite pole piece 120 and an inductive primary winding 122 which are assembled in a fashion identical with the corresponding elements on the left side of the FIGURE 1 apparatus. Float portion 26 is also provided with a cavity 124 which receives a ferrite pole piece 126 slotted to receive a secondary winding 128 in insulative relation therewith. One end of winding 128 is grounded to the float portion 26 through a resilient contact 129 and the other end is connected to a resilient contact 130. This contact engages the conductive pin 131 of a second plug 132 placed in a bore through end wall 28. A thin conductive strip 134 is electrically connected to the pin 131 on the interior of the float portion 26. The conductive strip 134 which is insulatively bonded to the portion 26 extends along the end wall 28 and axially up the side wall 30 to a point on the lip 32 where it is electrically connected to the mid point of an arcuate conductive strip 136 as best seen in FIGURE 4. Conductive strip 136 extends circumferentially about the lip 32 to approximately adjacent the pillow blocks 36 and 38 so as to be accessibly adjacent the second phase input means of motors 18 and 20 respectively. The second input phase to motor 18 is made through a resilient contact 138 which depends from motor 18 perpendicular to the spin axis 22. A further resilient contact 140 depends from motor 20 in the same direction as contact 138. The contacts 138 and 140 engage the extremities of conductive strip 136 thereby to complete circuits to supply a second input phase to the motors 18 and 20. This phase may be supplied by means connected to the pins 142 and 143 of a plug 144 in housing 14.

In the assembly of the apparatus described above, it can readily be seen that the primary windings and pole pieces, the secondary windings and pole pieces, the end housings, the float portions and the combination of the rotor and motors may be treated as subassemblies and put together in advance of the final assembly. Accordingly the end housing 12 may be provided with the printed circuit disk 64 as well as leads 68 and 69 and set aside as a first subassembly. The pole piece 70 may be equipped with the primary winding 74 and contacts 78 and 79 and then inserted into the cavity 56 of end housing 12, connection between the winding 74 and the leads 68 being readily accomplished by contact alone. The pole tip 80 may be then subsequently added to the assembly.

Similarly a combination of pole piece 96 and secondary winding 98 together with the resilient contacts 102 and 103 may be inserted into the cavity 90 formed in the end wall 46 of portion 24. A similar subassembly technique may be applied to the elements of the right hand portion of the FIGURE 1 apparatus.

When the cartridge consisting of the inertial sensing element 16 and the motors 18 and 20 is placed onto the pillow blocks 36 and 38, the connection of input circuitry to one phase of each of the motors 18 and 20 is automatically accomplished by way of the resilient spring connectors 138 and 140 which engage conductor strip 136. Finally, the assembly of the two float portions 24 and 26 make the final electrical connection between the other phase of each of the motors 18 and 20 and the proper input for that phase by way of the conductive strip 116. Since the apparatus may be assembled in various steps it may correspondingly be disassembled in various steps permitting access to certain parts of the apparatus without the requirement for complete disassembly.

In operation, winding 74 is energized with one phase of a two phase source while winding 122 is energized with the second phase. The alternating currents in windings 74 and 122 produce flux which travels the axial gaps between pole pieces 70 and 96 and 120 and 126 thereby producing axial magnetic forces tending to maintain the float assembly 10 in the central position. The pole tips 84 and 106 and the corresponding elements on the right side of the FIGURE 1 apparatus produce concentric rings of concentrated flux which tend to resist any radial displacement of the float assembly 10 relative to the end housings 12 and 14. The inductive secondary windings 98 and 128 have induced therein by transformer action the respective phases of the input power supply for the two phase hysteresis motors 18 and 20.

It is to be understood that the foregoing description of a specific embodiment of the invention is illustrative in nature and is not to be construed in a limiting sense. For a definition of the invention reference should be had to the appended claims.

We claim:

1. In a gyroscope, a float assembly comprising first and second mutually engageable portions which, in the engaged state, have a common longitudinal axis, the first portion comprising a substantially cylindrical cup having an end wall and an axial bore to define a side wall terminating in an annular lip, a first strip conductor insulatively bonded to the first portion and extending from a point of entry through the end wall, along said side wall to a first contact point, the second portion comprising a substantially cylindrical cup having an end wall and an axial bore to define a sidewall, the sidewall of the first portion being radially dimensioned to receive the side wall of the second portion for interior engagement therewith when said portions are brought into coaxial engagement, a second strip conductor insulatively bonded to the second portion and extending from a point of entry through said end wall, along the side wall to a second contact point, means defining an inertial reference and including a stator shaft, a rotor wheel mounted for rotation about the shaft and a two-phase motor for rotating the wheel about the shaft axis, electrical input means for the motor including a pair of resilient contacts depending from the motor adjacent opposite ends of the shaft for receiving separate phases of a two-phase supply signal, and means for mounting the shaft to the second float portion so that one of the contacts engages the second contact point and, when the first and second portions are engaged, the other contact engages the first contact point whereby said first strip forms part of a first motor input circuit and said second strip forms part of a second motor input circuit.

2. The gyroscopic apparatus defined in claim 1 together with additional two-phase power input means comprising first and second inductive windings disposed on the end walls of the first and second float portions, respectively, external to the bores thereof and symmetrical about the longitudinal axis, and conductive means connecting one end of the first and second windings through said end walls to the first and second conductive strips, respectively.

3. The apparatus defined in claim 1 wherein the end wall of each of the first and second float portions has formed therein an external and axially extending cylindrical cavity, the combination further including first and second power pickup means disposed in the cavities of the first and second portions respectively, for suspending the float assembly for rotation about the longitudinal axis and for supplying power to said motor, each of said means comprising a cylindrical pole piece of magnetic material adapted to conform to the cavity and having an annular slot formed therein symmetrically about said axis, an inductive winding insulatively disposed within the slot, resilient contact means insulatively connecting one end of the winding through the associated end wall to the conductive strip, and resilient contact means connecting the other end of the coil to the float portion whereby a voltage induced in the winding is applied to a separate stator phase of said motor.

4. Apparatus as defined in claim 3 further including first and second power input means each comprising a cylindrical pole piece of magnetic material having an annular slot formed therein, an inductive primary winding disposed within the slot, and support means for the pole piece and winding, the first and second power input means being disposed adjacent but axially spaced from the first and second power pickup means respectively, and respective conductive means for electrical energy of distinct phases to the primary windings whereby energy is transferred to the windings of the power pickup means by transformer action.

5. Apparatus as defined in claim 4 wherein each of the pole pieces has a plurality of concentric grooves formed therein for concentrating flux extending between adjacent pole pieces when the primary windings are energized, thereby to provide increased magnetic forces tending to maintain the float assembly in a radially central position between the power input means.

6. In a single axis gyro, a float assembly comprising first and second mutually engageable portions having a common longitudinal axis, the first portion comprising an axially symmetrical cup having an end wall and an axial step bore to define a side wall terminating in an annular lip and an annular step mediate the lip and end wall, a first strip conductor insulatively bonded to the bore of the first portion and extending from a first point of entry through the end wall thereof, along the side wall to the step, and arcuately along the step to terminate in first and second circumferentially spaced contact points, the second portion comprising an axially symmetrical cup having an end wall, an axial bore to define a side wall terminating in an annular lip and an external annular step mediate the lip and the end wall for sealable engagement with the lip of the first portion when said portions are brought into coaxial engagement, a second strip conductor insulatively bonded to the bore of the second portion and extending from a second point of entry through the end wall thereof, along the side wall to the lip and arcuately along the lip to terminate in third and fourth circumferentially spaced contact points, a rotatably mounted inertial sensing element and first and second two phase motors for driving the element about an axis of rotation, the combination of the element and the motors being mounted to the second float portion so that the axis of rotation is transverse to the longitudinal axis of the float assembly, first phase input means for the motors including first and second resilient contacts depending from the first and second motors, respectively, to engage the first and second contact points, and second phase input means including third and fourth resilient contacts depending from the first and second motors, respectively, to engage the third and fourth contact points.

7. A power input assembly for a magnetically supported gyro float carrying at least one secondary winding for power transfer purposes including a support body having a longitudinal axis adapted to correspond to the longitudinal axis of a gyro and a cylindrical cavity formed in the body along the axis terminating at an end wall and opening toward the float, a disk shaped circuit board carrying two circumferentially spaced semi-annular conductive strips symmetrically about the axis, respective input leads extending through the body to the strips, a cylindrical pole piece of magnetic material disposed in the cavity axially adjacent but spaced from the strips, an annular slot formed in the pole piece about said axis, an inductive primary winding insulatively bonded within the slot, and a pair of resilient contact means electrically connected to opposite ends of the winding and depending toward and contacting the strip to complete an energizing circuit for the winding.

8. The assembly defined in claim 7 wherein the pole piece has formed therein a plurality of concentric grooves symmetrical about the axis and facing the float to produce a flux concentration pattern in the pole piece when the winding is energized.

References Cited

UNITED STATES PATENTS 3,112,962   12/1963   Lautzenhiser _____ 74—5 X
3,316,032   4/1967   Wolf _____ 74—5 X
3,344,676   10/1967   Lautzenhiser et al. __ 308—10 X ROBERT A. O'LEARY, Primary Examiner WILLIAM E. WAYNER, Assistant Examiner U.S. Cl. X.R.

33—226; 74—5; 308—10; 310—68.4